Jan. 1, 1963  H. ALLEN  3,071,342
GATE
Filed Aug. 28, 1953  2 Sheets-Sheet 1

Herbert Allen
INVENTOR.

BY Browning, Simmo & Hyer
ATTORNEYS

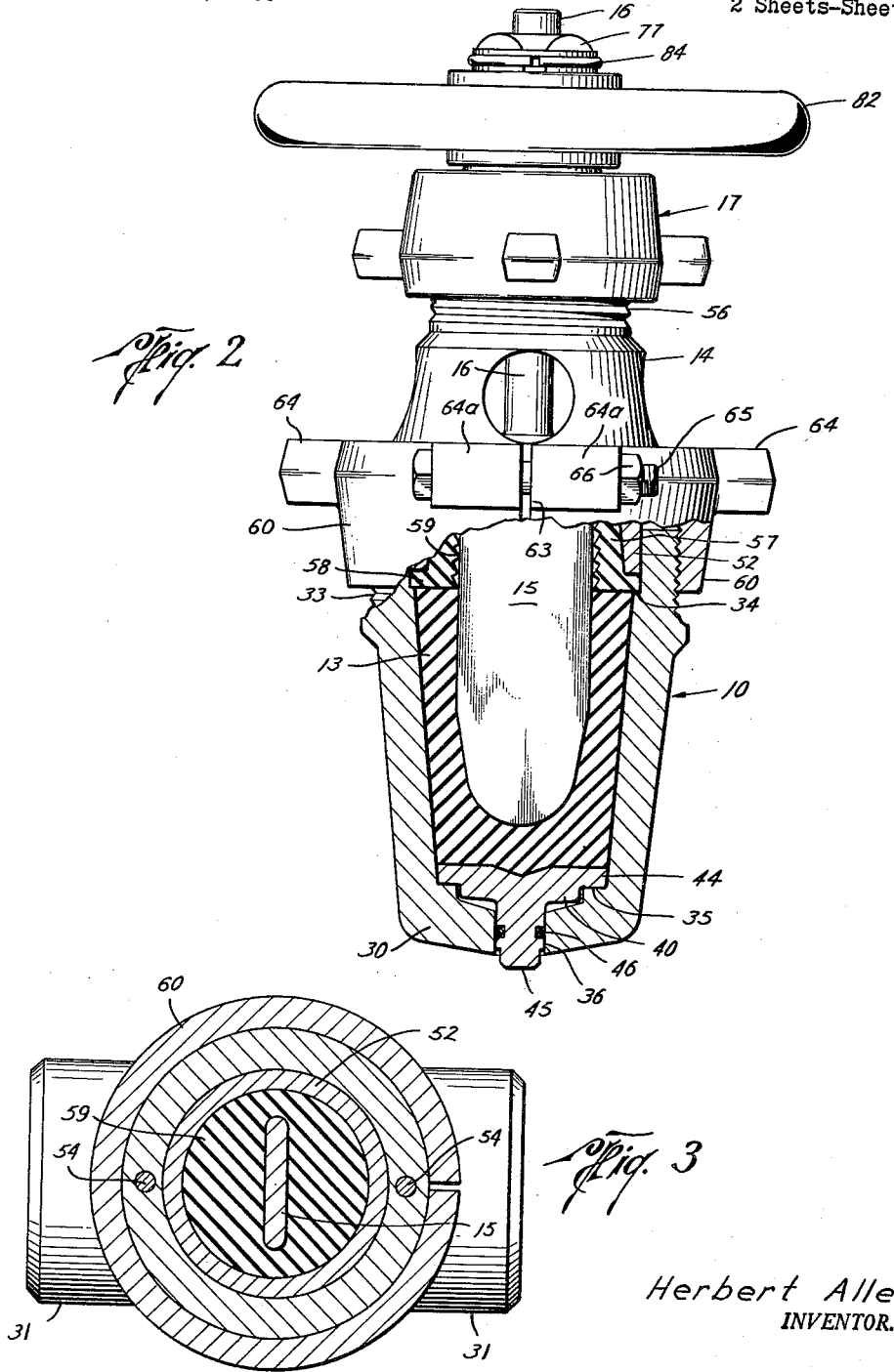

United States Patent Office 3,071,342
Patented Jan. 1, 1963

3,071,342
GATE
Herbert Allen, Houston, Tex., assignor, by mesne assignments, to Rockwell Manufacturing Company, Pittsburgh, Pa., a corporation of Pennsylvania
Filed Aug. 28, 1953, Ser. No. 377,145
4 Claims. (Cl. 251—171)

This invention relates to a gate valve and more particularly to a gate valve for controlling drilling mud flow in oil well drilling.

A gate valve of the general type involved in this invention is shown in the United States Letters Patent No. 2,329,315. This patent shows a valve having a split housing and containing a resilient body of sealing material for seating the gate and for forming a seal around the gate.

Valves of the type shown in that patent have proven highly satisfactory and have enjoyed extensive commercial use. However, in this type of valve the seal is effected solely by the compressive force of the gate in the closed position causing the insert, or resilient sealing body, to flow and completely fill the space and there is no way to adjust the size of the space which holds the resilient sealing body. Thus, variation from the intended original size and volume of the resilient body may reduce the effectiveness of the valve and may require dismantling of the valve and replacement of the resilient sealing body. Such variation may be caused by wear in the resilient sealing body or by lack of maintenance of a sufficiently close manufacturer's tolerance.

It is therefore an object of this invention to provide a gate valve of the general character just referred to in which the size of the space which holds the resilient insert may be adjusted to compensate for variations in the size of the insert.

It is also true that with valves having split housings in order to clamp the housing sections together adequately to withstand the very high pressures which are found in some oil wells, the clamping bolts and the portions of the housing sections carrying the bolts must be made quite large increasing the size and the cost of the valve.

Another object of this invention therefore is to provide a gate valve of the general type having a unitary body and having a resilient seat insert forming a seat for the gate and a seal around the gate, in which the insert may be placed in the body through a lateral opening in the body, the opening being closed by a bonnet carrying the gate when the valve is assembled.

Another object is to provide a high pressure gate valve of the type referred to in which the insert is a molded rubber and metal insert providing a seat for the gate and forming a seal around the gate.

Furthermore, in split housing gate valves having replaceable seat inserts it has been necessary in order to replace the inserts, that the pipe line connections to the valve be disconnected to permit separation of the housing sections.

It is another object of this invention therefore to provide a gate valve having a unitary body with an opening therein providing for the insertion and removal of a seat insert without disconnecting the valve from its pipe line connections.

In valves of the character involving a seat insert of combined resilient material and rigid reinforcement which not only forms a seal about the flow passage between the gate and the body on each side of the gate but also encloses and abuts the end of the gate when it is closed, it has been found that the gate does not separate readily from the insert at the beginning of opening movement and the bottom portion of the insert tends strongly to follow the gate, resulting in damage to or destruction of the insert.

It is therefore an object of this invention to provide reinforcement for that portion of the insert which encloses the end of the gate when the valve is shut to prevent it from following the opening movement of the gate.

These and other objects will become apparent upon perusal of the following specification and the accompanying drawings, in which are set forth, by way of example and illustration, one embodiment of the invention.

In the drawings:

FIG. 2 is a side view, partly in section, taken along lines 2—2 of the valve shown in FIG. 1; and FIG. 3 is a sectional view of the same valve taken along lines 3—3 of FIG. 1.

Figure 1:
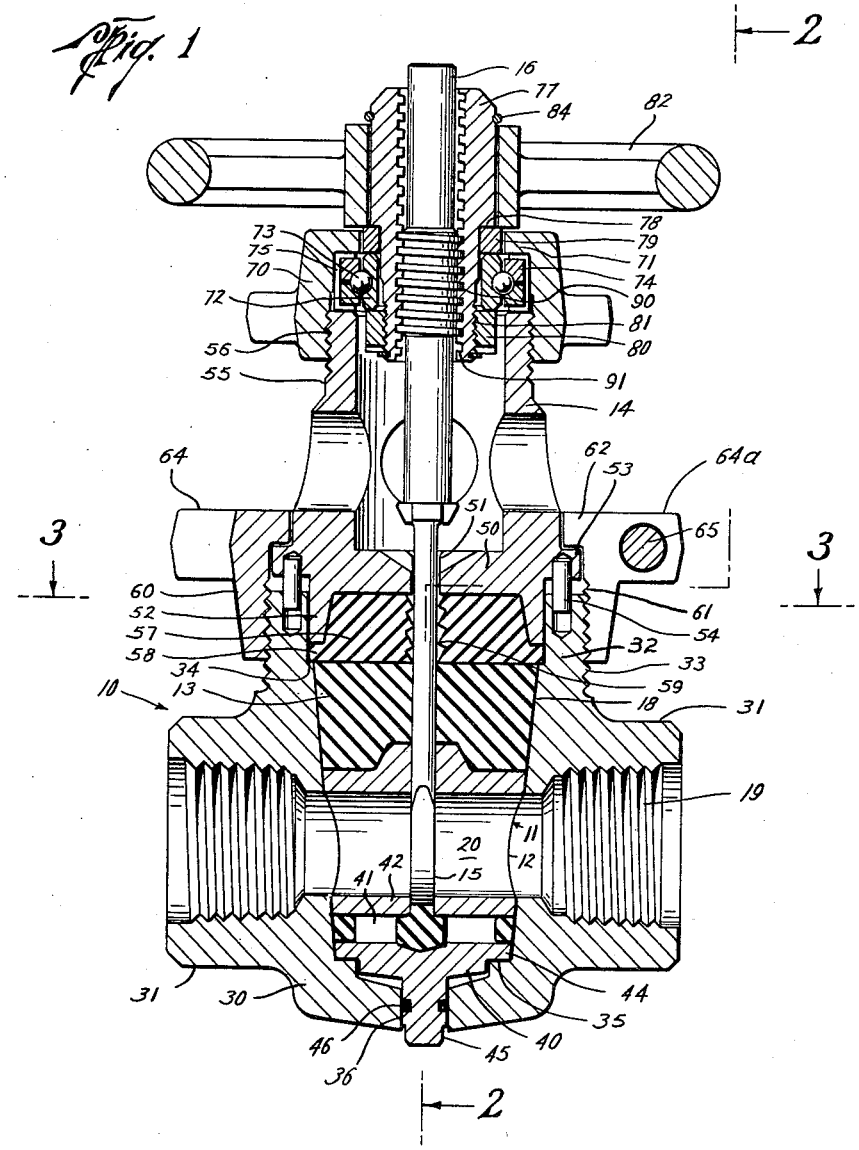
FIG. 1 is a vertical sectional view of a gate valve embodying this invention.

Referring more particularly to the drawings, the gate valve illustrated as embodying this invention comprises generally a unitary body 10, a seat insert 11 including a metal portion 12 and a resilient portion 13, a bonnet 14 mounted on the unitary body, adjustment means for moving the bonnet toward and allowing it to move away from the body 10, a gate 15 having a stem 16 and a support structure and operating means 17 for the gate stem. The unitary body 10 has a lateral opening 18 therein and the seat insert 11 can be inserted into and removed from the body through this opening 18. The body and the seat insert have openings 19 and 20 which are in alignment with each other and form a flow-way, and the seat insert is adapted to receive the gate which is movable into and out of a lateral opening in the insert to open and close the flow-way. The unitary body 10, the bonnet 14, the metal portion 12 of the seat insert, and the gate 15 when seated form an enclosed space confining the resilient portion 13 of the seat insert.

The feature of making the valve body unitary eliminates the need for bolts or massive fastening means for holding it together. This feature is particularly important when the valve is used with a high pressure pipe line.

Thus, the adjustment means for moving the bonnet toward and allowing it to move away from the unitary body provides a means for varying the size of the space in which the resilient portion 13 of the seat insert in confined when the valve is closed.

Since the bonnet 14 is removably secured to the unitary body 10, it is possible to remove the bonnet and replace the entire seat insert 11 through the lateral opening in the body when it is necessary, thus eliminating the necessity for disconnecting the valve body from the flow line in which it would be connected in use.

Referring in more detail to the various components of the gage valve illustrated, the unitary body 10 has a base portion 30 and oppositely extending hubs 31 threaded internally, or provided with other connecting means, to receive the pipe line connections. The hubs 31 and the base portion provide a flow-way 19 through the valve body. A projection 32 which is shown as substantially cylindrical, extends laterally from the hubs 31 of the valve and has a laterally opening chamber 18 intersecting the flow-way 19, and means to receive and secure a bonnet thereon, shown as external threads 33. The projection 32 is provided with an annular outwardly facing shoulder 34 within and spaced a short distance from the open end of the chamber 18. The chamber thence tapers inwardly to a second shoulder 35 which faces in the same direction and is also annular. This shoulder 35 serves as a positive stop to position the seat insert. A bore 36 is provided in the base portion 30 for a purpose which will presently appear.

The seat insert 11 which is insertable into and removable from the body through the tapered opening 18 is preferably, though not necessarily, formed with its metal and its resilient portions molded as one piece and has a shape generally corresponding to the chamber in the body. The metal portion 12 of the seat insert in this instance includes a base 40 having a pair of upstanding projections 41 each supporting an annular section 42 through which a flow-way 20 is provided for alignment with the flow-way 19 in the unitary body thereby forming a composite flow passage through the valve. The space between these annular sections 42 constitutes an opening transversely of or laterally from the flow passage and receives the gate 15. The gate 15 may then be moved into and out of position blocking the flow passage through the seat insert. The base 40 of the metal portion of the insert is provided with an annular shoulder 44 to engage the shoulder 35 in the body and provide a stop to position the seat insert flow-way in alignment with the body flow-way. A stem 45 projects from the base through the bore 36 to the exterior of the valve body 10 and is useful in pushing the seat insert 11 out of the opening in the body when replacement is desirable. A sealing ring 46 is provided in an annular groove in the stem 45 and serves as a seal around the stem 45.

The resilient portion 13 of the seat insert is preferably of synthetic rubber material and is molded to surround the metal portion 12 including the projections 41. When the seat insert is positioned in the chamber 18 of the body, the resilient portion engages the tapered portions of the chamber walls. The base 40 of the metal portion of the seat insert also serves to reinforce that portion of the seat insert which encloses the end of the gate when the valve is shut to prevent the resilient portion of the seat insert from following the opening movement of the gate.

The bonnet 14 which is mounted on the valve body has a cap portion 50 covering the chamber 18 and an aperture 51 in the cap providing a passage for the gate. An annular flange 52 projects from the bonnet cap 50 into the chamber 18 in the body and is arranged for close fitting relation with the chamber. The bonnet cap is also provided with an outwardly extending annular flange 53 having its lower face provided with bores having dowel pins 54 fitted therein. The bonnet also includes a hollow bearing support portion 55 upstanding from the cap 50 and having external threads 56 thereon. A resilient gate seal 57 may be provided between the bonnet cap 50 and the resilient portion 13 of the insert. This gate seal has an annular lip 58 for fitting between the shoulder 34 of the body and the annular flange 52, and also has a slot therein with sealing lips 59 arranged to form a seal around the gate 15 when the gate is inserted through the slot.

The bonnet 14 is removably secured to the body 10 by a lug nut 60 having internal threads 61 engaging the threads 33 on the projection 32 of the body. This lug nut has an annular shoulder 62 which overlaps and engages the flange 53 of the bonnet. The lug nut 60 is a one-piece ring-like structure have a longitudinal split 63 formed therein and having projecting lugs 64 at spaced positions about its periphery. Two similar lugs 64a are closely spaced on opposite sides of the split 63 and are bored to receive a locking bolt 65 and nut 66, thus providing means for locking the lug nut 60 in the position that provides the desired size of the enclosing space for the resilient portion 13 of the seat insert.

A gate support structure and operating means 17 comprised as follows is mounted on the bonnet housing. A bearing retaining nut 70 including an inwardly extending annular flange 71 near its upper end has internal threads arranged to engage the threads 56 on the bonnet housing. A thrust bearing including an inner rotating bearing race 72, ball bearings 73, and a split outer stationary bearing race 74 having cooperating portions secured together by a retainer 75, is positioned between the annular flange 71 of the bearing retaining nut and the bearing support 55. A stem nut 77 is provided with a downwardly facing annular shoulder 78 which receives a supporting ring 79 that in turn receives the inner rotating bearing race 72. This bearing race 72 is clamped tightly against the ring 79 and the ring 79 in turn against the stem nut shoulder 78 by an internally threaded thrust nut 80 threaded onto external threads 81 on the lower portion of the stem nut 77. Thus, the bearing race 72 and the stem nut 77 will be rotated as a unit on the ball bearings 73. A hand wheel 82 is non-rotatably mounted on the stem nut 77 for purposes of rotating it, and a snap ring 84 is fitted in a groove around the nut above the wheel to keep it in place on the stem nut.

The gate 15 is adapted for movement into and out of the seat provided by the resilient portion 13 of the seat insert. For this purpose, threads 90 on the stem 16 are arranged to cooperate with internal threads 91 on the stem nut 77, so that turning of the hand wheel 82 turns the nut and thereby causes movement of the gate 15 to open or close the flow-way.

It will thus be seen that the valve body, the bonnet, the metal portion of the seat insert, and the gate when closed form an enclosing space for the resilient portion of the seat insert. As the hand wheel 82 is rotated to move the gate into seating position, and to apply a compressive force to the resilient portion 13 of the seat insert, the resilient portion flows to form a seal around the gate and also to form a seal inside the unitary valve body 10 around the flow-ways 19 and 20. Movement of the gate against the resilient portion 13 in effect reduces the size of the enclosing space for this resilient portion. Thus small variations in the size of the resilient portion of the insert may be satisfactorily compensated for by the movement of the gate itself. It is on those occasions when variations are such that they cannot be successfully compensated for that the means provided in this invention for varying the size of the enclosing space is particularly desirable. This means has been illustrated in its preferred form as the bonnet cap 50 mounted for movement toward and away from the valve body 10 and the adjustable lug nut 60 for effecting or permitting such movement.

The gate valve herein disclosed in well suited for use in controlling mud flow where high pressure may be encountered, in fact, the valve has been operated under pressures as high as 10,000 p.s.i. An important contributing factor to the valve's ability to withstand high pressures is that its body is made of a unitary structure and can be formed as a steel forging having adequate strength to withstand high pressures.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a body having a flowway therethrough and an opening therein intersecting the flow-way, a seat assembly insertable and removable through the opening in the body, said assembly having a flowway therethrough registering with the flowway through body and an opening registering with the flowway through the body and an opening intersecting the flowway, a bonnet removably secured to the body to cover the opening therein, a gate mounted on the bonnet for movement through the opening in the bonnet and assembly to open and close the flowway, said assembly including rigid reinforcing portions surrounding the flowway on each side of the opening therein, a body of resilient material surrounding said rigid reinforcing portions and extending across said opening to abut the end of the gate when in flowway closing position, said valve body, bonnet, rigid reinforcing portions of the seal assembly, and the gate when in flowway closing position forming an inclosure confining the body of resilient material of said seat assembly, means to adjust the size of the enclosure within which the body of resilient material is confined, and an additional rigid reinforcing portion on the assembly attached to the resilient portion opposite the opening therein and extending continuously in a direction longitudinally of the flowway and substantially across said opening longitudinally of the flowway.

2. For use in a gate valve, a seat insert assembly having a flowway therethrough and an opening intersecting the flowway for receiving a gate in flowway closing position, said assembly including rigid reinforcing portions forming said flowway on opposite sides of the opening, a resilient portion surrounding said reinforcing portions and extending across said opening to abut the end of the gate when in flowway closing position, an additional rigid reinforcing portion attached to the resilient portions opposte the opening and extending continuously in a direction longitudinally of the flowway and substantially across said opening longitudinally of the flowway, said rigid reinforcing portions being formed integrally with one another.

3. A gate valve, comprising a body having a flowway therethrough and an opening therein intersecting the flowway, a seat assembly insertable and removable through the opening in the body, said assembly having a flowway therethrough registering with the flowway through the body and an opening therein intersecting the flowway, a gate movable in the assembly opening to open and close the flowway, and a bonnet removably secured to the body to cover the opening therein, said assembly including rigid reinforcing portions forming the flowway on each side of the opening therein, a body of resilient material surrounding said rigid reinforcing portions and extending across said opening to about the end of the gate when in flowway closing position, a recess on said body opposite the opening therein, and an outwardly projecting stem of rigid material for entering the recess when the assembly is inserted through the opening in the valve body, said recess extending through the body to enable the assembly to be jarred loose from the body, and said stem having a base portion extending laterally thereof opposite the opening to distribute the forces on the stem to a large area of the body of resilient material and reinforce the portion of said body of resilient material which abuts the end of the gate.

4. The gate valve according to claim 3, wherein seal means is provided between the stem and recess.

References Cited in the file of this patent
UNITED STATES PATENTS

| | | |
|---|---|---|
| 773,642 | Hayden | Nov. 1, 1904 |
| 2,194,262 | Allen et al. | Mar. 19, 1940 |
| 2,224,446 | Penick | Dec. 10, 1940 |
| 2,329,315 | Allen | Sept. 14, 1943 |
| 2,731,231 | Garrott | Jan. 17, 1956 |

FOREIGN PATENTS

| | | |
|---|---|---|
| 165,457 | Austria | Mar. 10, 1950 |

UNITED STATES PATENT OFFICE
CERTIFICATE OF CORRECTION

Patent No. 3,071,342                           January 1, 1963

Herbert Allen

It is hereby certified that error appears in the above numbered patent requiring correction and that the said Letters Patent should read as corrected below.

Column 2, line 44, for "in", second occurrence, read -- is --; column 4, line 43, for "in" read -- is --; line 44, for "pressure" read -- pressures --; column 5, lines 27 and 28, for "opposte" read -- opposite --; column 6, line 10, for "about" read -- abut --.

Signed and sealed this 5th day of November 1963.

(SEAL)
Attest:

ERNEST W. SWIDER
Attesting Officer

EDWIN L. REYNOLDS
Acting Commissioner of Patents